(12) United States Patent
Loney et al.

(10) Patent No.: US 6,808,377 B1
(45) Date of Patent: Oct. 26, 2004

(54) SEGMENTED TIRE MOLD

(75) Inventors: Gregory Lee Loney, Cuyahoga Falls, OH (US); David Chester Robek, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/980,668
(22) PCT Filed: Oct. 1, 1999
(86) PCT No.: PCT/US99/22799

§ 371 (c)(1),
(2), (4) Date: Nov. 27, 2001

(87) PCT Pub. No.: WO01/24987

PCT Pub. Date: Apr. 12, 2001

(51) Int. Cl.⁷ .............................................. B29C 35/00
(52) U.S. Cl. ........................ 425/47; 264/501; 264/102; 264/326
(58) Field of Search ................................ 264/501, 102, 264/325, 326, 328.1, 328.2, 328.3; 425/28.1, 38, 46, 47, 54, 55

(56) References Cited

U.S. PATENT DOCUMENTS

| 3,990,823 A | 11/1976 | Le Moullac |
| 4,289,463 A | 9/1981 | Le Moullac |
| 4,828,471 A | 5/1989 | Schlautmann |
| 5,141,424 A | 8/1992 | Christof |
| 5,190,767 A | 3/1993 | Beres et al. |
| 5,585,064 A | 12/1996 | Moris-Herbeuval |
| 6,096,248 A * | 8/2000 | Fraser et al. .................. 264/39 |

FOREIGN PATENT DOCUMENTS

| DE | 2201012 | 1/1973 |
| FR | 1 590 815 | 4/1970 |
| GB | 1 176 162 | 1/1970 |
| GB | 1 409 008 | 10/1975 |

* cited by examiner

Primary Examiner—James Sells
(74) Attorney, Agent, or Firm—Brouse McDowell; Roger D. Emerson

(57) ABSTRACT

A segmented tire mold having radially movable circumferentially spaced sliding center segments activated by sliding connections between an upper mold half and the segments in response to opening and closing of the mold.

6 Claims, 4 Drawing Sheets

SEGMENTED TIRE MOLD

This application is a 371 of PCT/US99/22799 filed Oct. 1, 1999.

TECHNICAL FIELD

This invention relates to segmented tire molds and especially to molds having center segments which are movable radially in response to opening and closing of the mold.

BACKGROUND OF THE INVENTION

Full segmented molds such as the mold shown and described in U.S. Pat. No. 5,585,064 provide for expanding and contracting segments, however, the segments are mounted on the top mold and must be lifted to retract the segments. In addition to the added power required to lift the segments, the wear on the parts is also a disadvantage of this type of mold.

Other segmented molds, such as the mold shown in Great Britain Patent GB 1,176,162 provide hinged segments with springs for retracting the hinge pins of the segment. The tilt type segmented molds of this type do not provide for loading an uncured tire without engaging the bridge work on the segments. This is especially objectional for molds with curved segmental boundary designs where the mold segments must be retracted in a direction perpendicular to the vertical axis of the segments.

SUMMARY OF THE INVENTION

The present invention is directed to a segmented mold having radially movable center segments which are mounted on the lower mold half. Each center segment has a slotted connection with a sloped surface of the upper mold half for retracting and then returning the segment to the registered position for molding a tire. The slot in the center segment is open at the top to permit opening of the mold without lifting of the segment. A spring holds the center segment in a radially outward position against a stop in the lower mold half which positions the slot for engagement with the upper mold half upon closing of the mold.

In accordance with one aspect of the invention there is provided a segmented tire mold having an upper mold half, a lower mold half and radially movable circumferentially spaced sliding segments characterized by:

a. each of the sliding segments being mounted on the lower mold half for radial movement, b. a disengagable sliding connection between the upper mold half and each of the sliding segments for moving the segments radially of the mold between an open retracted position and a closed molding position.

In accordance with another aspect of the invention there is provided a method of vulcanizing a tire in a segmented tire mold having an upper mold half, a lower mold half and radially movable circumferentially spaced center segments in sliding engagement with the lower mold half and slidably engagable with the upper mold half upon closing of the mold characterized by:

a. opening the mold by lifting the upper mold half away from and out of sliding engagement with the center segments, b. moving the center segments radially outward by the sliding engagement with the upper mold half, c. limiting the movement of the center segments radially outward by stop means on the lower mold half, d. placing an unvulcanized tire on the lower mold half, e. lowering the upper mold half in sliding engagement with the center segments for moving the center segments radially inwards into engagement with the tire upon closing of the mold, f. applying heat to the tire mold to vulcanize the tire, g. lifting the upper mold half for sliding the center segments radially outward on the lower mold half, and h. removing the tire from the tire mold.

DETAILED DESCRIPTION OF THE INVENTION

Figure 1:
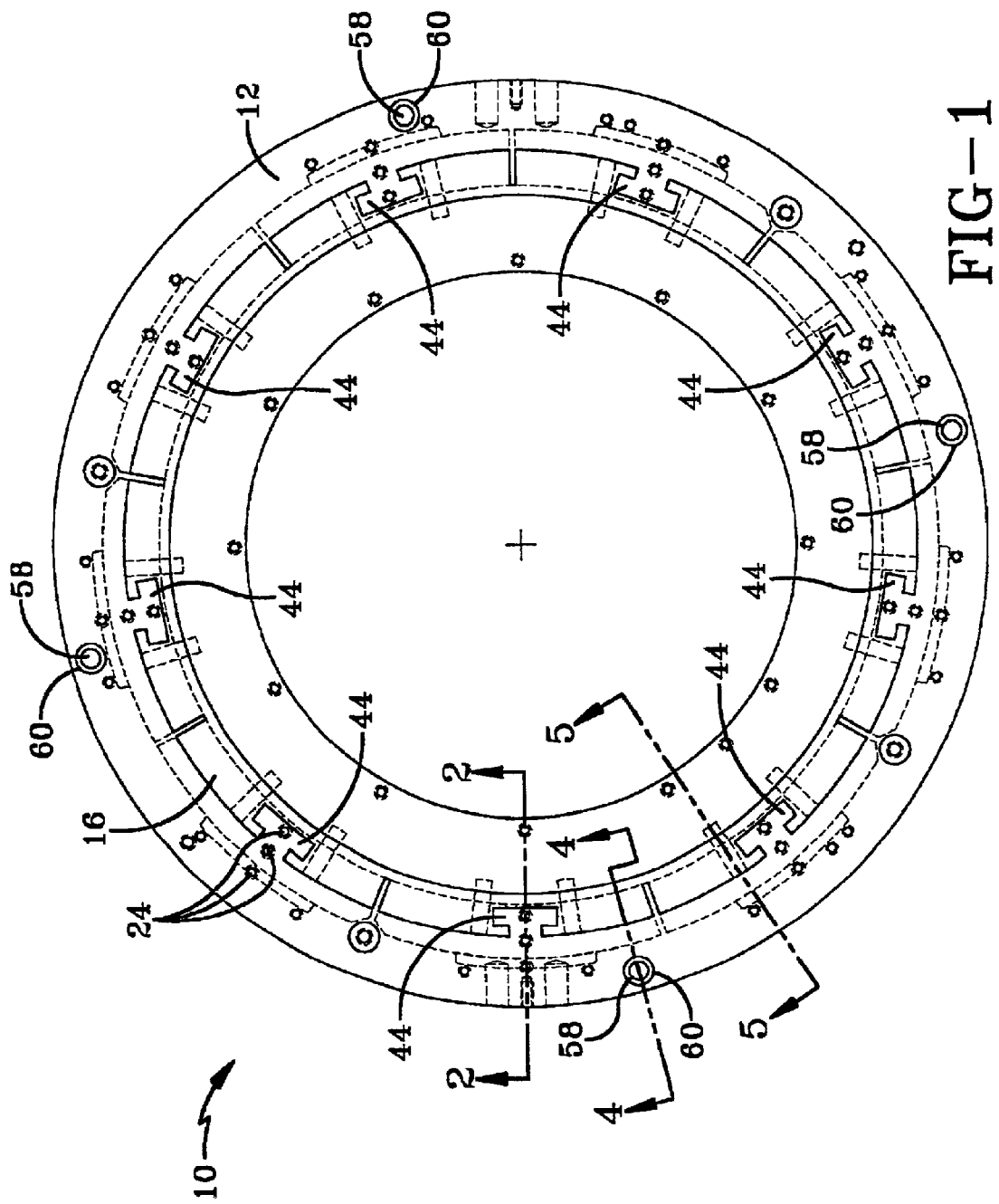
FIG. 1 is a plan view of the lower mold half and the center segments embodying the invention.
Figure 2:
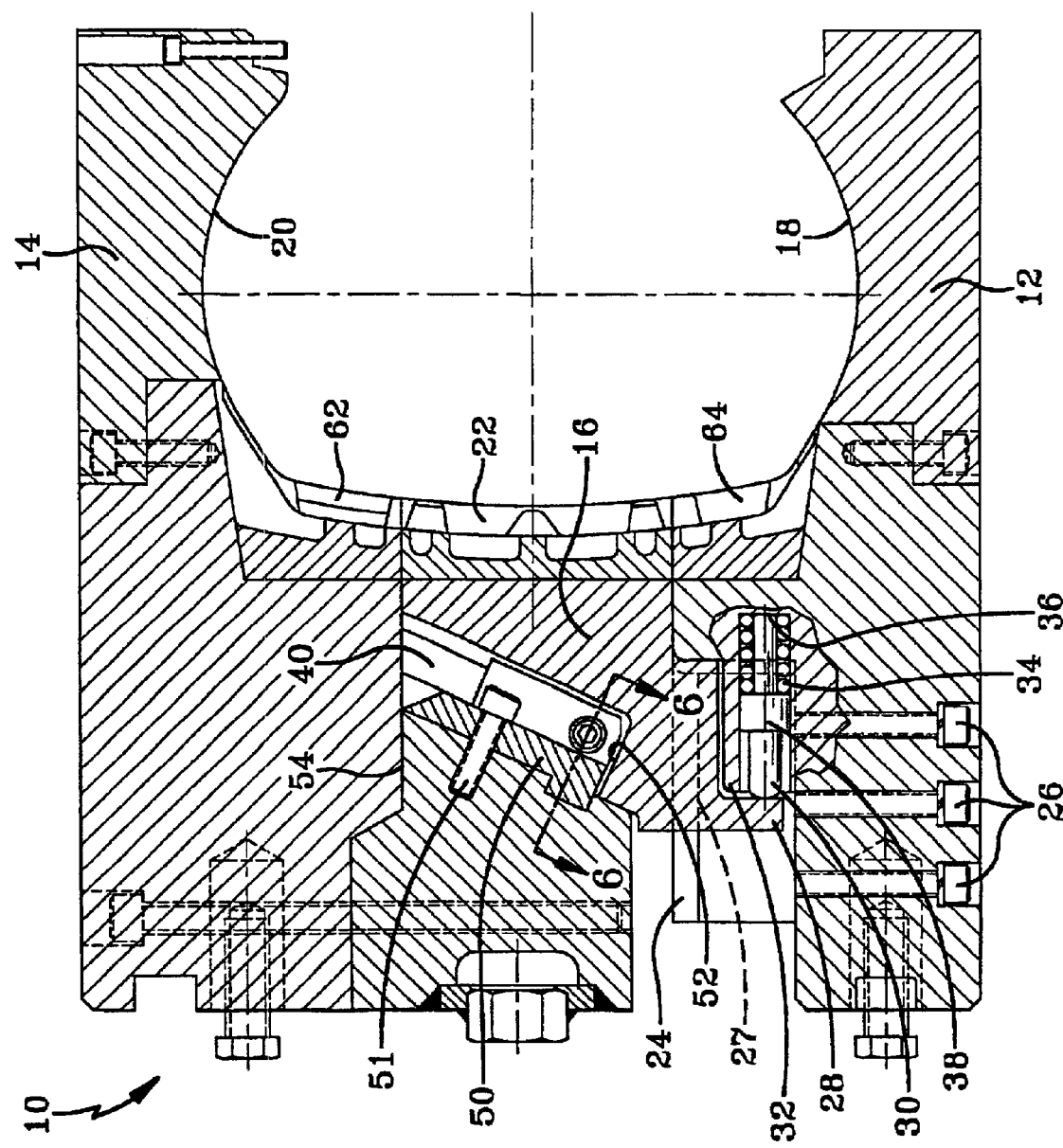
FIG. 2 is a section of the mold embodying the invention taken along line 2—2 in FIG. 1 with parts being broken away to show the plunger and coil springs of the mold in the closed position.

Referring to FIGS. 1 and 2, a segmental tire mold 10 is shown having a lower mold half 12, an upper mold half 14 and radially movable center segments 16. The lower mold half 12 and the upper mold half 14 have sidewall forming surfaces 18 and 20 respectively. The center segment 16 has tread forming surfaces 22, which are movable radially for disengaging the mold 10 from the tire after vulcanization.

Each of the center segments 16 is slidably mounted on a T-bar 24, fastened to the lower mold half 12 by bolts 26 or other suitable means. Each T-bar 24 extends radially of the mold 10 and slides in a slot 27 extending radially of the mold.

Each of the center segments 16 also have recesses 36 with end flanges 28 for plungers 30 mounted in sleeves 32 mounted on the lower mold half 12 and urged radially outward by coil springs 34 located between the recessed surface 36 in the lower mold half 12 and a flange 38 on the plunger 30. The coil springs 34 hold the center segments 16 in the fully retracted position after mold half 12 is pulled away from the center segments 16.

Figure 6:
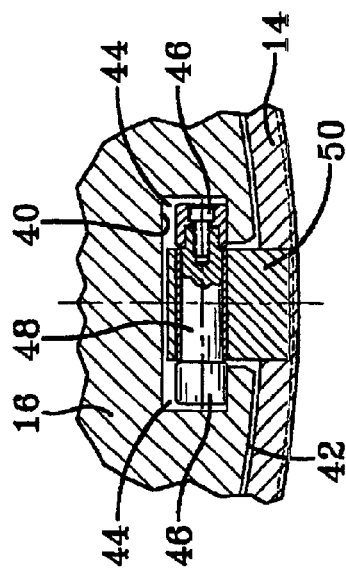
FIG. 6 is an enlarged fragmentary sectional view of the sliding connection between the upper mold half and one of the center segments taken along line 6—6 in FIG. 2.

Referring to FIG. 6, a slot 40 is provided in a sloped surface 42 of the center segment 16 and has grooves 44 for receiving rollers 46 mounted on a shaft 48, supported by a bar member 50 which is bolted to the upper mold half 14 by a bolt 51. The slot 40 extends from a base surface 52 to a top edge 54 of the center segment 16. With this construction, lifting of the upper mold half 14 from the position shown in FIG. 2 to the position shown in FIG. 3 provides for travel of the rollers 46 upward through the grooves 44 pulling the center segments 16 radially outward to the position shown in FIG. 3.

Figure 3:
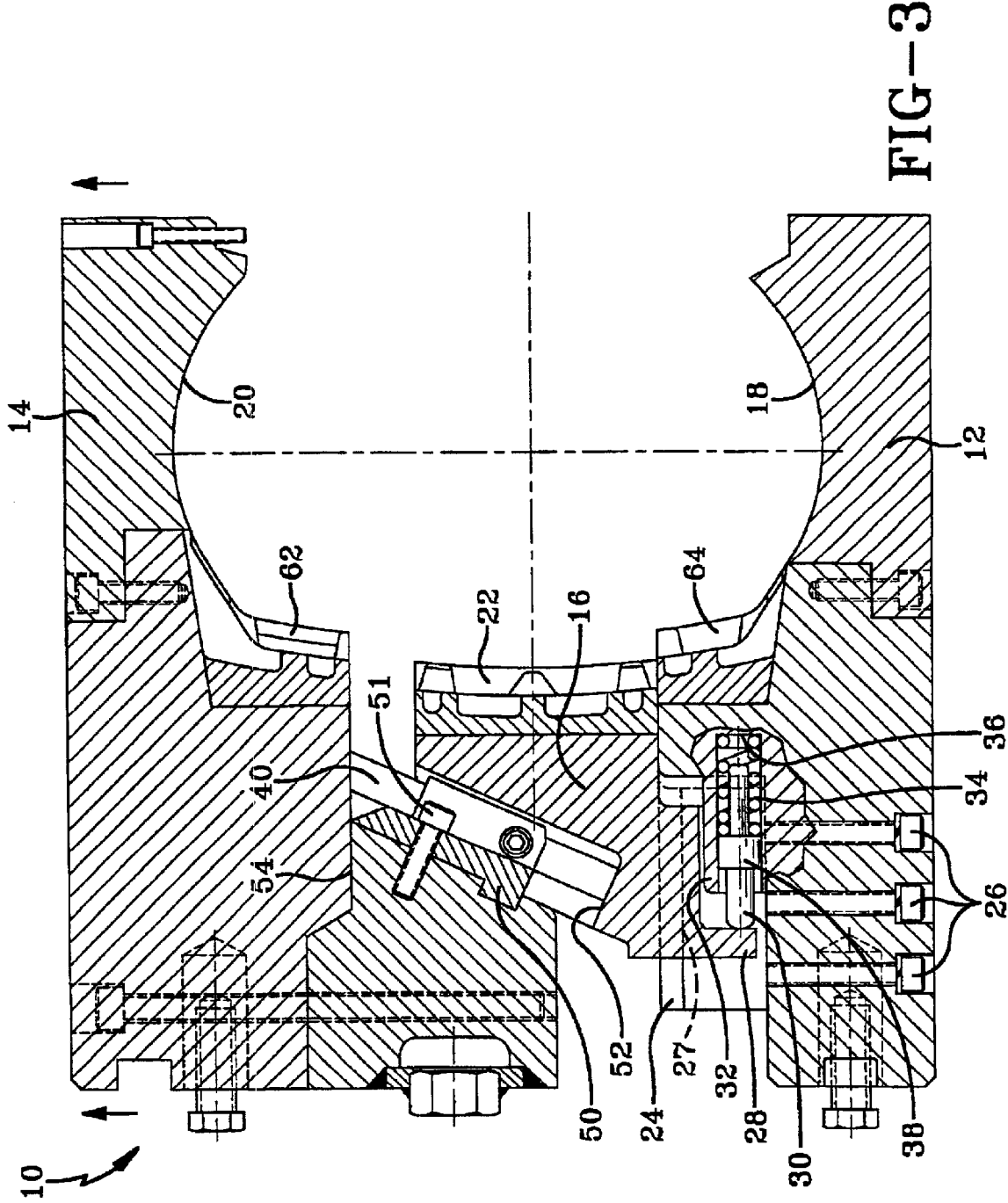
FIG. 3 is a section like FIG. 2 showing the center segment in a partially retracted position.
Figure 5:
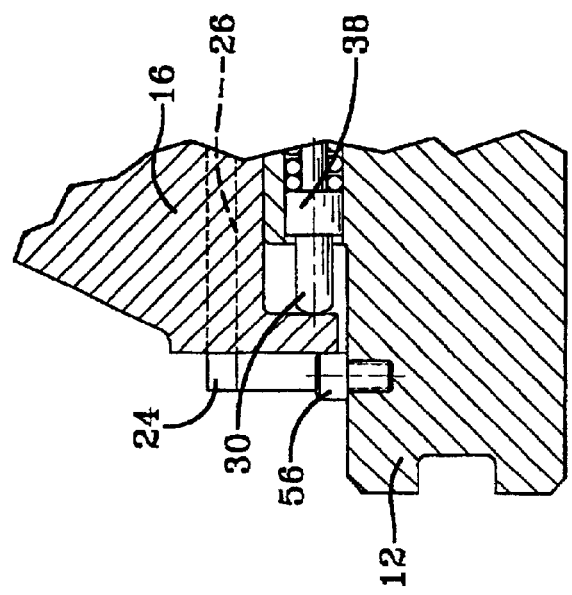
FIG. 5 is an enlarged fragmentary sectional view of the lower mold half taken along the line 5—5 in FIG. 1 showing the stop means and spring pin for a center segment in the fully retracted position.

Referring to FIG. 5, stop means, such as bolts 56 are located on the lower mold half 12 at spaced apart positions for limiting the radially outward movement of the center segments 16 beyond the partially open position shown in FIG. 3 to a position where the upper mold half 14 is lifted away from the lower mold half 12 and center segment 16 removing the rollers 46 from the grooves 44. The bolts 56 hold the center segments 16 in the position shown in FIG. 5 by springs 36 so that when the upper mold half 14 is lowered onto the center segment 16, the rollers 46 will be in alignment with and enter the grooves 40 for closing the mold 10.

Figure 4:
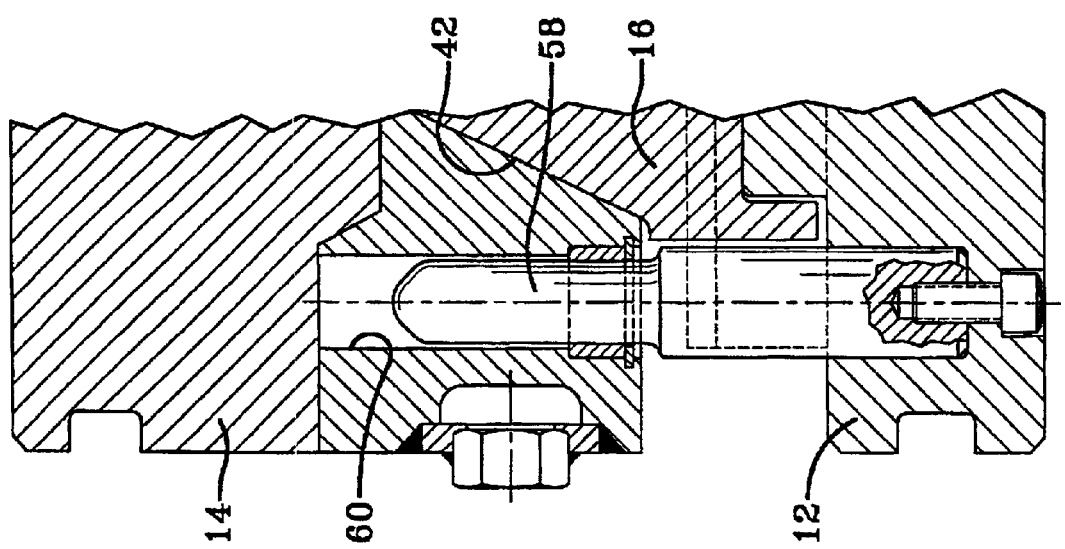
FIG. 4 is a enlarged fragmentary sectional view of one of the centering pin connections between the lower mold half and the upper mold half taken along the plane of line 4—4 in FIG. 2.

Referring to FIG. 4, centering pins 58 are mounted in the lower mold half 12 at circumferentially spaced positions for registering in holes 60 in the upper mold half 14 when the upper mold is lowered into position over the center segment 16 and lower mold half 12.

The upper mold half 14 has shoulder forming surfaces 62 adjacent the sidewall forming surfaces 20 and the lower mold half 12 has shoulder forming surfaces 64 adjacent the sidewall forming surfaces 18. Positioned between the shoulder forming surfaces 62 and 64 are the tread forming surfaces 22 on the center segments 16.

In addition to the lower mold half 12, upper mold half 12 and center segments 16, the segmental tire mold 10 also includes means for heating the molds and lifting and lowering the upper mold half 14. These services are well known in the art and are included in this disclosure, although not shown in the drawings or described herein.

In operation the segment tire mold 10 is opened by lifting the upper mold half 14 away from the center segments 16 and lower mold half 12 causing the center segments 16 to retract to a partially open position shown in FIG. 3. The springs 36 move the segments 16 to the fully open position shown in FIG. 5. A green unvulcanized tire is then lowered into the lower mold half 12 and the upper mold half 14 lowered so that the centering pins 58 shown in FIG. 4 are registered in the centering pin holes 60. The grooves 44 in the center segments are then in position for receiving the rollers 46 of the segment bars 50 in the slots 40 of the center segments 16. Further lowering of the upper mold half 14 from the position shown in FIG. 3 to the position shown in FIG. 2 causes the tread forming surfaces 22 of the center segments 16 to move radially inward into the position shown in FIG. 2. During the closing of the mold 10, the springs 34 are compressed by movement of the flange 28 radially inward against the plungers 30. The segmental tire mold 10 is then in position for molding the tire upon the application of heat for a predetermined period of time.

After the tire is vulcanized, the mold 10 is opened by raising the upper mold half 14. This results in radially outward movement of the center segments 16 due to the action of each T-bar 24 in each slot 27 of each center segment. As the upper mold half 14 is lifted, the rollers 46 attached to the upper mold half engage the surfaces of the slot 40 in the center segments 16 urging them radially outward out of engagement with the cured tire tread. The upper mold half 14 may then be lifted away from the center segment 16 and lower mold half 12 for removal of the tire.

What is claimed is:

1. A segmented tire mold having an upper mold half, a lower mold half and radially movable circumferentially spaced sliding segments characterized by:
   a. each of said sliding segments being mounted on said lower mold half for radial movement; and,
   b. a disengagable sliding connection between said upper mold half and each of said sliding segments for moving said segments radially of said mold between an open retracted position and a closed molding position, said disengagable connection comprising a plurality of spaced T-bars mounted on said upper mold half and engagable with a slot in each of said segments.

2. A segmented tire mold in accordance with claim 1 further characterized by a spring being mounted in said lower mold half and in engagement with each of said sliding segments for holding said segments in said open retracted position.

3. A segmented tire mold having an upper mold half, a lower mold half and radially movable circumferentially spaced sliding segments characterized by:
   a. each of said sliding segments being mounted on said lower mold half for radial movement; and,
   b. a disengagable sliding connection between said upper mold half and each of said sliding segments for moving said segments radially of said mold between an open retracted position and a closed molding position, said disengagable connection comprising a T-bar mounted on said upper mold half in sliding engagement with a slot in each of said sliding segments.

4. A segmented tire mold in accordance with claim 3 further characterized by said T-bar having rollers for engagement with surfaces of said slot for reducing the sliding resistance of said second sliding connection.

5. A segmented tire mold in accordance with claim 1 further characterized by said lower mold half having circumferentially spaced centering pins extending upwardly for register in corresponding spaced-apart holes in said upper mold half.

6. A tire mold in accordance with claim 1 further characterized by stop members mounted on said lower mold half radially outward of said sliding segments for limiting radial movement upon opening of said mold.

\* \* \* \* \*